(12) United States Patent
Liaw et al.

(10) Patent No.: US 8,497,930 B2
(45) Date of Patent: Jul. 30, 2013

(54) AUTOMATIC FOCUSING METHOD AND DEVICE IN HIGH-NOISE ENVIRONMENT

(75) Inventors: Ming-Jiun Liaw, Mialoi County (TW); Shih-Yuan Peng, Taipei County (TW)

(73) Assignee: Altek Corporation, Hsinchu (TW)

( * ) Notice: Subject to any disclaimer, the term of this patent is extended or adjusted under 35 U.S.C. 154(b) by 1019 days.

(21) Appl. No.: 12/541,928

(22) Filed: Aug. 15, 2009

(65) Prior Publication Data

US 2010/0165174 A1    Jul. 1, 2010

(30) Foreign Application Priority Data

Dec. 31, 2008  (TW) ................. 97151791 A (51) Int. Cl.
G03B 13/00 (2006.01)
H04N 5/232 (2006.01)

(52) U.S. Cl.
USPC ........................................ 348/354

(58) Field of Classification Search
USPC ................................. 348/345–356
See application file for complete search history.

(56) References Cited

U.S. PATENT DOCUMENTS

| | | | | |
|---|---|---|---|---|
| 5,231,443 A * | 7/1993 | Subbarao | ................. | 396/93 |
| 7,084,910 B2 * | 8/2006 | Amerson et al. | ............. | 348/239 |
| 7,653,298 B2 * | 1/2010 | Ono | ............................. | 396/121 |
| 7,990,581 B2 * | 8/2011 | Matsuura | ..................... | 358/450 |
| 2008/0219654 A1 * | 9/2008 | Border et al. | ................. | 396/89 |
| 2009/0169122 A1 * | 7/2009 | He et al. | ........................ | 382/238 |
| 2009/0201385 A1 * | 8/2009 | Takayama | ................. | 348/222.1 |
| 2011/0221953 A1 * | 9/2011 | Pollard | ........................ | 348/345 |

* cited by examiner

*Primary Examiner* — Sinh Tran
*Assistant Examiner* — Christopher K Peterson
(74) *Attorney, Agent, or Firm* — Morris Manning & Martin LLP; Tim Tingkang Xia, Esq.

(57) ABSTRACT

An automatic focusing method and device in a high-noise environment are used for determining a focusing distance between a digital imaging device and an object to be photographed. The automatic focusing method includes the steps of capturing M pre-photographed images at different object distances respectively; loading the pre-photographed images; superposing every N (N<M) pre-photographed images to create (M−N+1) composite images; redefining the object distances corresponding to the (M−N+1) composite images; calculating high-frequency signals in the focusing regions of the (M−N+1) composite images; determining an optimum focusing object distance based on the relation between the high-frequency signals and corresponding object distances; and adjusting an automatic focusing lens to the optimum focusing object distance and accomplishing focusing.

11 Claims, 7 Drawing Sheets

AUTOMATIC FOCUSING METHOD AND DEVICE IN HIGH-NOISE ENVIRONMENT

CROSS-REFERENCE TO RELATED APPLICATIONS

This non-provisional application claims priority under 35 U.S.C. §119(a) on Patent Application No(s). 097151791 filed in Taiwan, R.O.C. on Dec. 31, 2008, the entire contents of which are hereby incorporated by reference.

BACKGROUND OF THE INVENTION

1. Field of Invention

The present invention relates to an automatic focusing method and device, and more particularly to an automatic focusing method and device in a high noise environment.

2. Related Art

With the development of digital cameras, photographing has been no longer a costly consumption. A user can take a desired image at will to record a moment or scenario worth memorizing. When photographing, the subject is generally focused in order to emphasize the subject. In other words, the focus distance is aligned to the object to be photographed. Therefore, most cameras have the automatic focusing function.

Figure 1A:
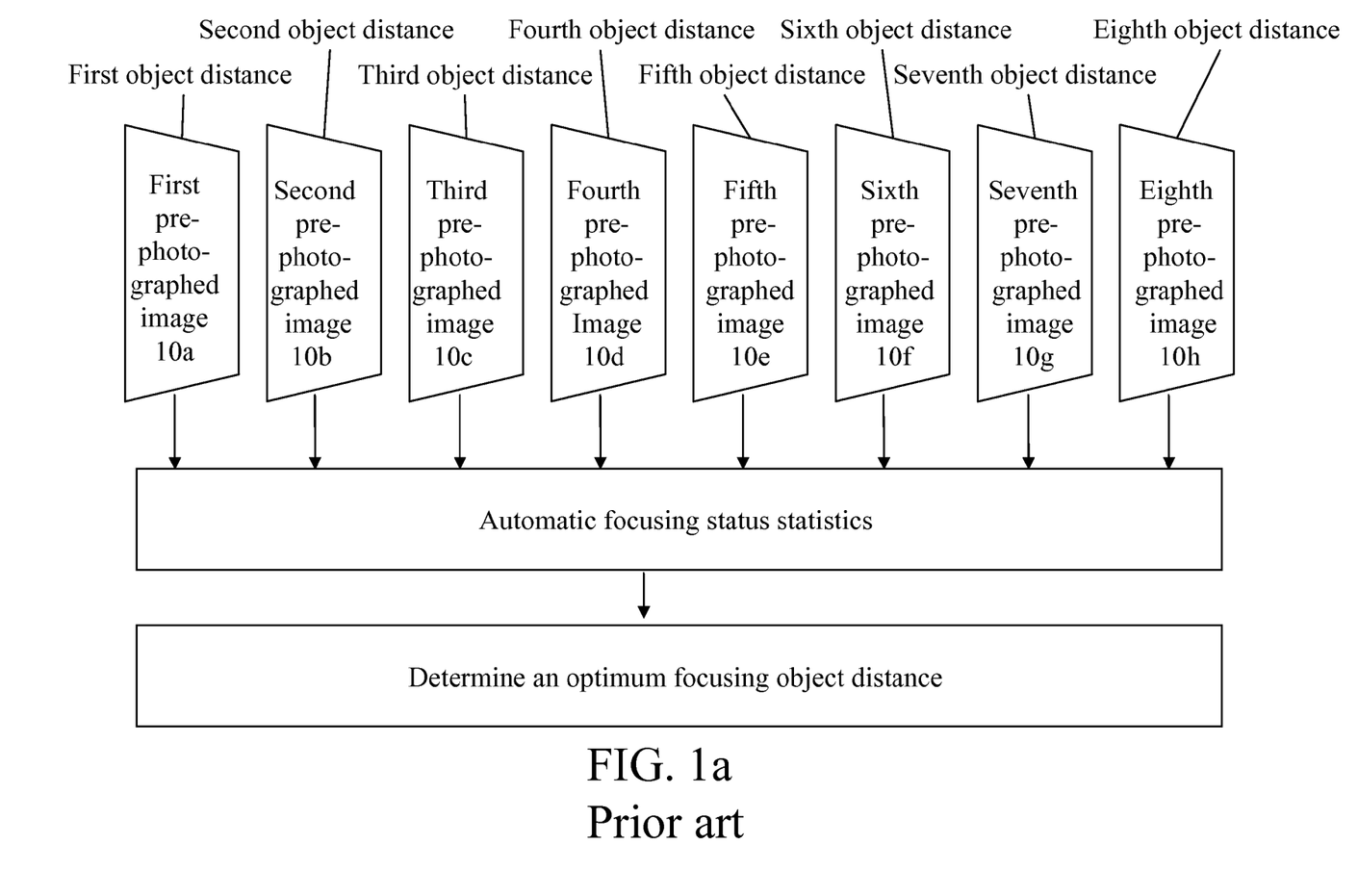
FIG. 1a is a schematic view of high-frequency signals being calculated with multiple images in the prior art.
Figure 1B:
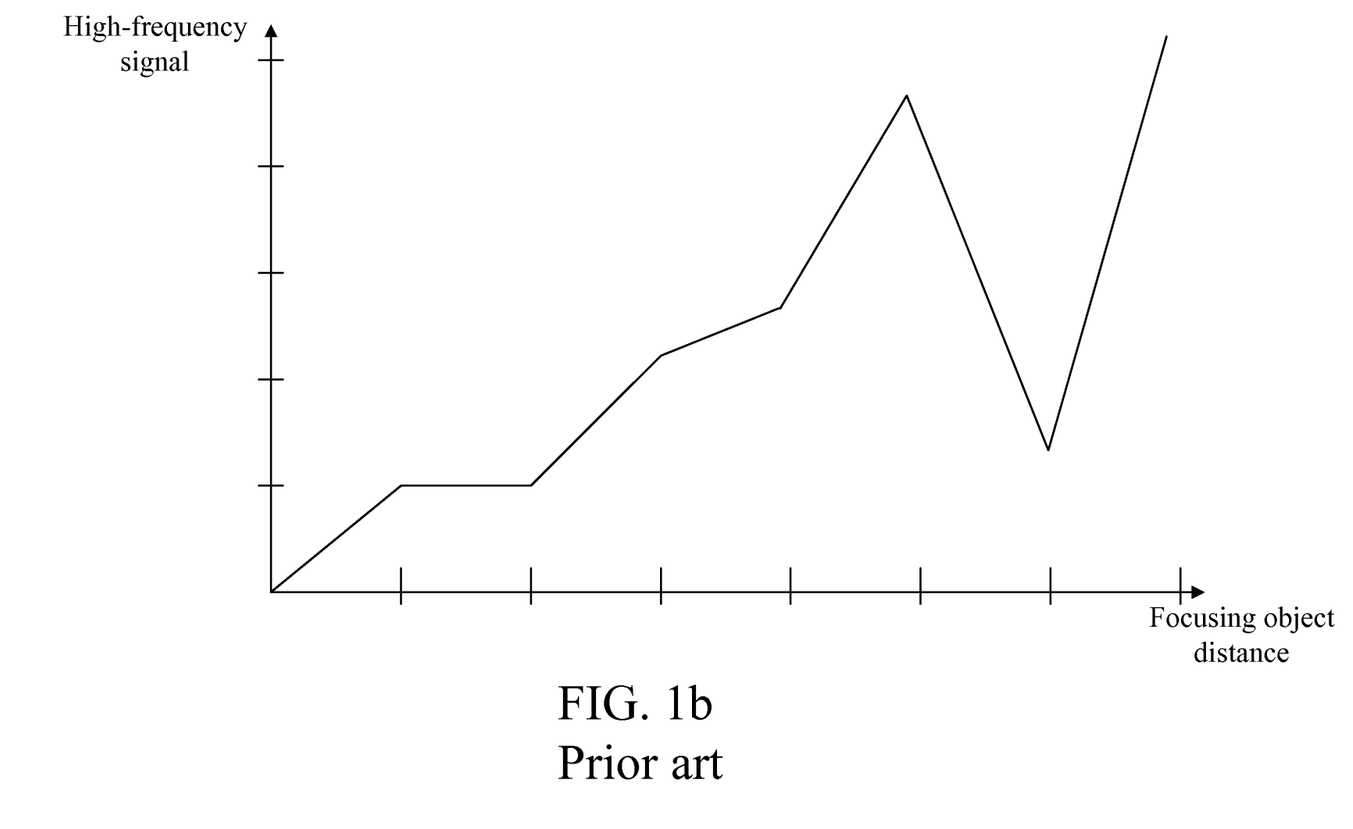
FIG. 1b is a schematic view showing the relation between the object distances and the high-frequency signals generated in a high-noise environment in the prior art.

Referring to FIG. 1a, in the prior art of focusing, corresponding images are pre-photographed 10a, 10b, 10c, 10d, 10e, 10f, 10g, 10h at different object distances. Then a high-frequency signal in a focusing frame for each pre-photographed image is calculated, and a relation between the high-frequency signals and the corresponding object distances as shown in FIG. 1b is derived. The optimum focusing position is determined by using the conventional curve fitting technology. However, when photographing in an environment with low luminance, a circuit is required to amplify the signal so as to obtain an image that has been properly exposed. However, noises in the image are also amplified, so that both real signals and noises are interspersed in high-frequency signals and failure of focusing often arises in severe cases. As shown in FIG. 1b, with the inferences from noises, there is often no apparent global maximum in the relation between the high-frequency signals and the corresponding object distances. As such, an automatic focusing procedure fails to determine the optimum focusing position or determines an erroneous focusing position.

In such case, in order to improve the success ratio of focusing, one of the approaches is to reduce noises in the system. For example, elements or processes with high quality are employed, or more layers are laid out in the printed circuit board. However, no matter how the noises are reduced, they still get amplified with a high gain, not to mention the increased costs in doing so. Another approach is to develop a more accurate de-noising algorithm. However, the de-noising capability thereof is limited anyway, and fabricating a precise algorithm into a circuit is rather costly. Therefore, it is still the objective for many researchers to improve the success ratio of focusing in a high-noise environment with a low cost.

SUMMARY OF THE INVENTION

In view of the above problem, the present invention is an automatic focusing method in a high-noise environment.

In order to achieve the above objective, the present invention provides an automatic focusing method, which comprises the steps of: capturing M pre-photographed images at M different object distances respectively; loading the pre-photographed images; superposing every N (N<M) pre-photographed images to create (M−N+1) composite images; redefining the object distances corresponding to the (M−N+1) composite images; calculating high-frequency signals in the focusing regions of the (M−N+1) composite images; determining an optimum focusing object distance based on the relation between the high-frequency signals and corresponding object distances; and moving an automatic focusing lens to the optimum focusing object distance and accomplishing focusing.

The present invention provides a digital imaging device with automatic focusing function in a high-noise environment, which is used for determining the focus distance between the digital imaging device and the object to be photographed.

In order to achieve the above objective, the present invention provides a digital imaging device, which comprises an automatic focusing lens, a photo-sensing element, a storage unit, and a microprocessor. The automatic focusing lens is used to adjust the object distance between the digital imaging device and the object to be photographed. The photo-sensing element is used to record the brightness of the environment and the object to be photographed by the digital imaging device, and convert the brightness of the object to be photographed into an electrical signal. The storage unit is used to store a plurality of pre-photographed images. The microprocessor is electrically connected to the photo-sensing element and the storage unit. The microprocessor comprises at least an image superposing unit, an object distance resetting unit, and a high-frequency signal calculation unit, and is used for performing the automatic focusing method in a high-noise environment presented by the present invention in the foregoing paragraph.

In terms of the features and implementations of the present invention, embodiments are to be described in detail in conjunction with the drawings hereinafter.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 2A:
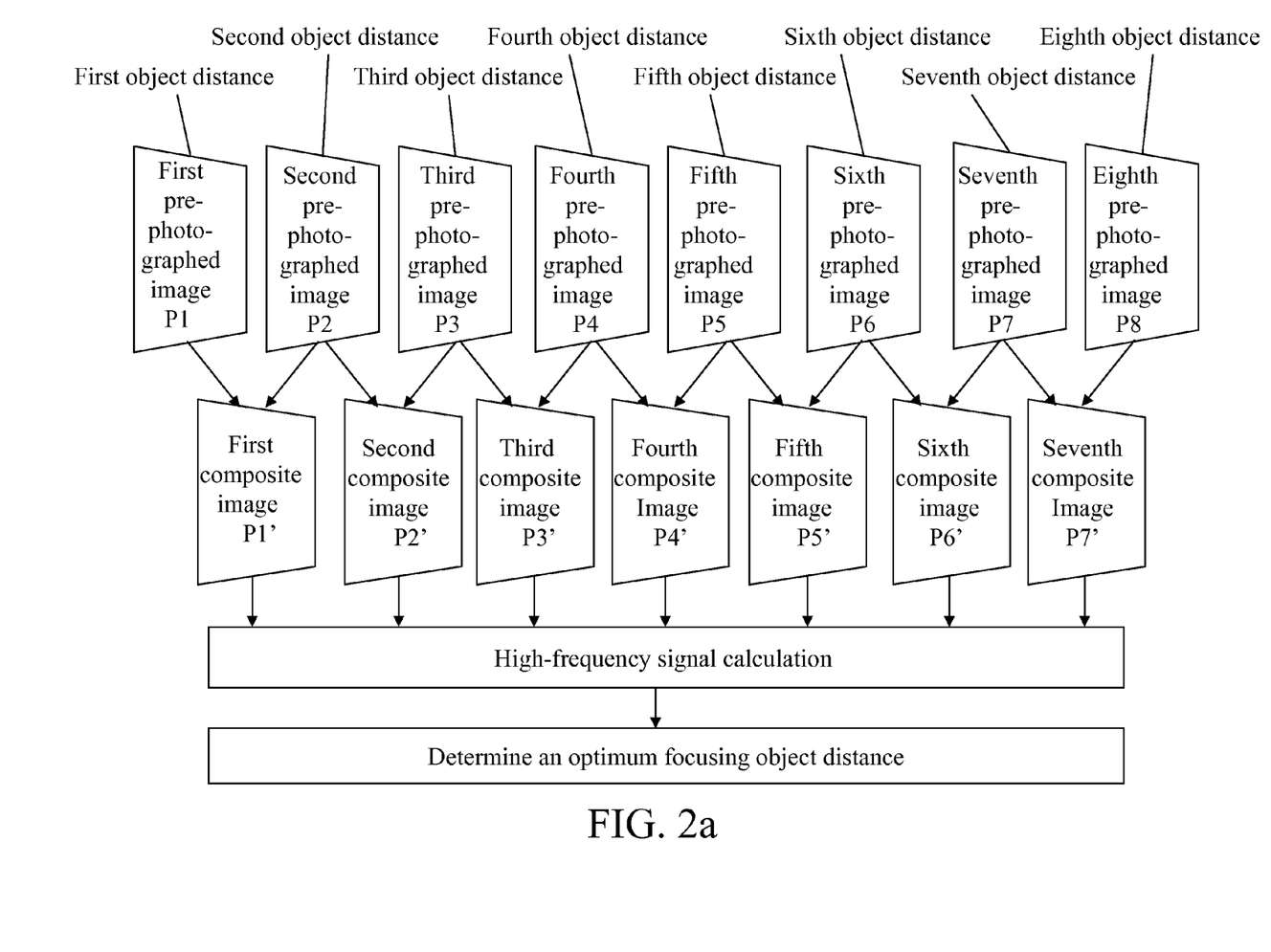
FIG. 2a is a schematic view showing the principle of the present invention.

Refer to FIG. 2a for a clear description of the basic operation flow of the present invention. First M pre-photographed images are captured at M different object distances respectively, and each pre-photographed image $P_M$ has a corresponding Mth object distance position, with M=8 in FIG. 2a. The pre-photographed images are loaded. Every N (N<M) consecutive pre-photographed images are superposed to create (M−N+1) composite images, with N=2 in FIG. 2a. After superposition of images, noises in the composite images are greatly reduced and the success ratio of automatic focusing is significantly enhanced. Letting M=8 in the present invention by way of example, a first pre-photographed image $P_1$, a second pre-photographed image $P_2$, a third pre-photographed image $P_3$, a fourth pre-photographed image $P_4$, a fifth pre-photographed image $P_5$, a sixth pre-photographed image $P_6$, a seventh pre-photographed image $P_7$, and an eighth pre-photographed image $P_8$ are respectively obtained in FIG. 2a.

Next, object distances corresponding to the (M−N+1) composite images are redefined by the following process. The object distance for the first pre-photographed image $P_1$ is $S_1$, the object distance for the second pre-photographed image $P_2$ is $S_2$, and a composite object distance $S_1'$ for a first composite image $P_1'$ created by superposing the first and second pre-photographed images $P_1$ and $P_2$ is the median point of $S_1$ and $S_2$, that is, $S_1'=(S_1+S_2)/2$. After the object distance has been reset, composite object distances $S_1', S_2', \ldots, S_{(M-N-1)}'$ corresponding to the first composite image $P_1'$, the second composite image $P_2'$ ... the (M+N+1)th composite image $P_{(M-N+1)}'$ are respectively derived. In this way, a first composite image $P_1'$, a second composite image $P_2'$, a third composite image $P_3'$, a fourth composite image $P_4'$, a fifth composite image $P_5'$, a sixth composite image $P_6'$, and a seventh composite image $P_7'$ are obtained.

Figure 2B:
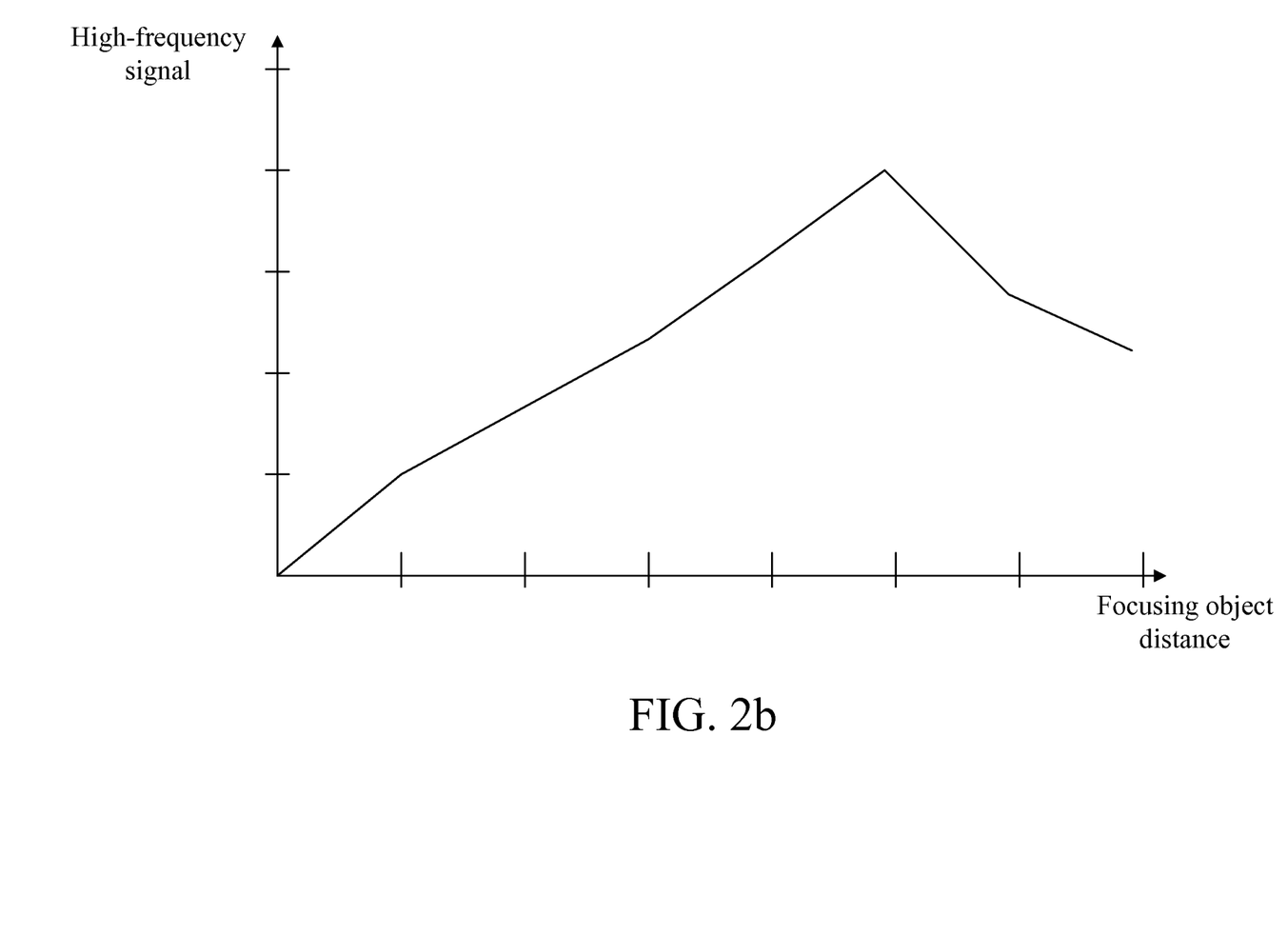
FIG. 2b a schematic view showing the relation between the object distances and the high-frequency signals generated in a high-noise environment according to the present invention.

Then, high-frequency signals of the composite images ($P_1'$-$P_7'$) are calculated. As such, relation between high-frequency signals and corresponding object distances for composite images as shown in FIG. 2b are derived. As the noises in the composite images have been considerably reduced, the high-frequency signals are mostly originated from details of the object being photographed instead of the high-frequency noises. Therefore, a curve with an optimum focusing position that is more apparent is derived as shown in FIG. 1b compared with the relational curve derived by the prior art. Success ratio of automatic focusing is thus considerably enhanced. Finally, based on the relation between the high-frequency signals and corresponding object distances for the composite images ($P_1'$-$P_7'$), a focusing object distance corresponding to the maximum high-frequency signal is determined.

Figure 3:
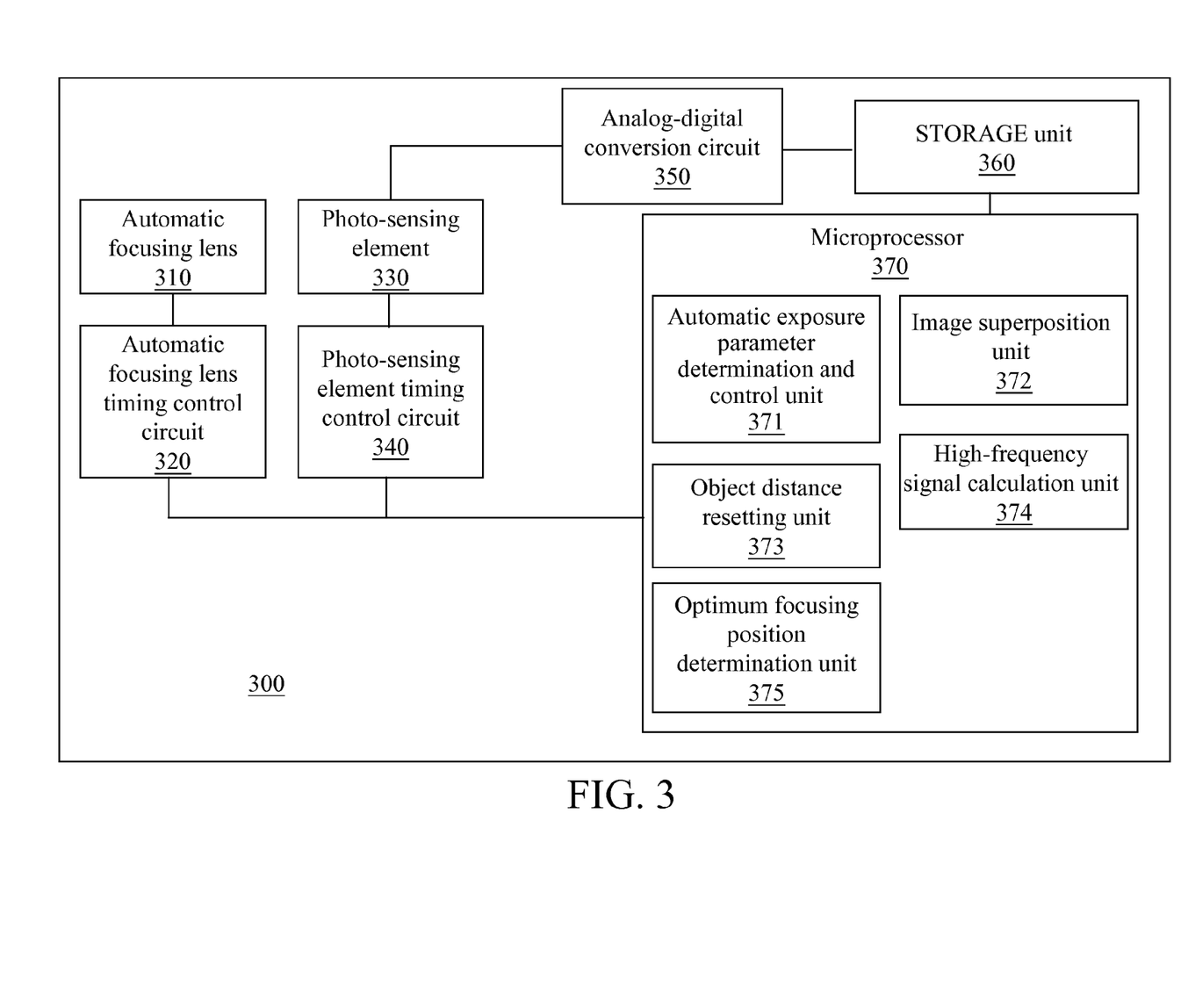
FIG. 3 is an architectural view of the present invention.

In practical implementation, referring to FIG. 3, an architectural view of the present invention is shown. A digital imaging device 300 according to the present invention comprises an automatic focusing lens 310, an automatic focusing lens timing control circuit 320, a photo-sensing element 330, a photo-sensing element timing control circuit 340, an analog-digital conversion circuit 350, a storage unit 360, and a microprocessor 370.

The automatic focusing lens 310 is electrically connected to the automatic focusing lens timing control circuit 320. The automatic focusing lens timing control circuit 320 is electrically connected to the microprocessor 370, for receiving control instructions from the microprocessor 370 to drive the automatic focusing lens 310. The automatic focusing lens timing control circuit 320 controls the automatic focusing lens 310 to move and image the environment and object being photographed onto the photo-sensing element 330. The photo-sensing element 330 is a photoelectric conversion element, which serves to record the optical signals of the environment and object being photographed and convert the optical signal into an electrical signal. The photo-sensing element 330 may be, for example, a charge-coupled device (CCD) or a Complementary Metal-Oxide-Semiconductor (CMOS).

The photo-sensing element 330 is used to record the brightness of the environment and object being photographed by the digital imaging device 300, and convert the brightness of the object being photographed into an electrical signal. The photo-sensing element timing control circuit 340 is electrically connected between the photo-sensing element 330 and the microprocessor 370, and generates a control signal under control of the microprocessor 370 for driving the photo-sensing element 330 and thereby causing the photo-sensing element 330 to generate at least one analog signal. The analog-digital conversion circuit 350 is electrically connected to the photo-sensing element 330, the photo-sensing element timing control circuit 340, and the storage unit 360, converts the analog signal from the photo-sensing element 330 into a digital signal under control of the photo-sensing element timing control circuit 340, and transmits the digital signal to the storage unit 360 for storage.

The storage unit 360 used for storing a plurality of digital images is electrically connected to the analog-digital conversion circuit 350 and the microprocessor 370. The storage unit 360 is used to perform data read/write operation under control of the microprocessor 370. The microprocessor 370 further comprises an automatic exposure parameter determination and control unit 371, an image superposition unit 372, an object distance resetting unit 373, a high-frequency signal calculation unit 374, and an optimum focusing position determination unit 375.

In practical implementation, the automatic exposure parameter determination and control unit 371 determines proper exposure parameters, comprising the exposure time, the aperture size, and the International Standards Organization (ISO), depending on the photographing environment. Then, the microprocessor 370 sets the aperture of the automatic focusing lens 310 through the automatic focusing lens timing control circuit 320, and sets the exposure time and the ISO value through the photo-sensing element timing control circuit 340. M pre-photographed images are captured at different M object distances correspondingly by using the exposure parameters, and the pre-photographed images are stored in the storage unit 360.

The microprocessor 370 then controls the image superposition unit 372, the object distance resetting unit 373, and the high-frequency signal calculation unit 374 arranged therein for activation. The image superposition unit 372 is used to superpose the pre-photographed images to create multiple composite images. The object distance resetting unit 373 is used to calculate the object distance corresponding to each composite image and obtain corresponding object distances of the same number as that of the composite images. The high-frequency signal calculation unit 374 is used to calculate the high-frequency signal for at least part of pixels in each composite image and obtain the high-frequency signals of the same number as that of the composite images. The high-frequency signal calculation unit 374 is a high-pass filter, a band-pass filter, a Fourier transformation unit, a discrete cosine transformation unit, or a discrete wavelet transformation unit.

Figure 4:
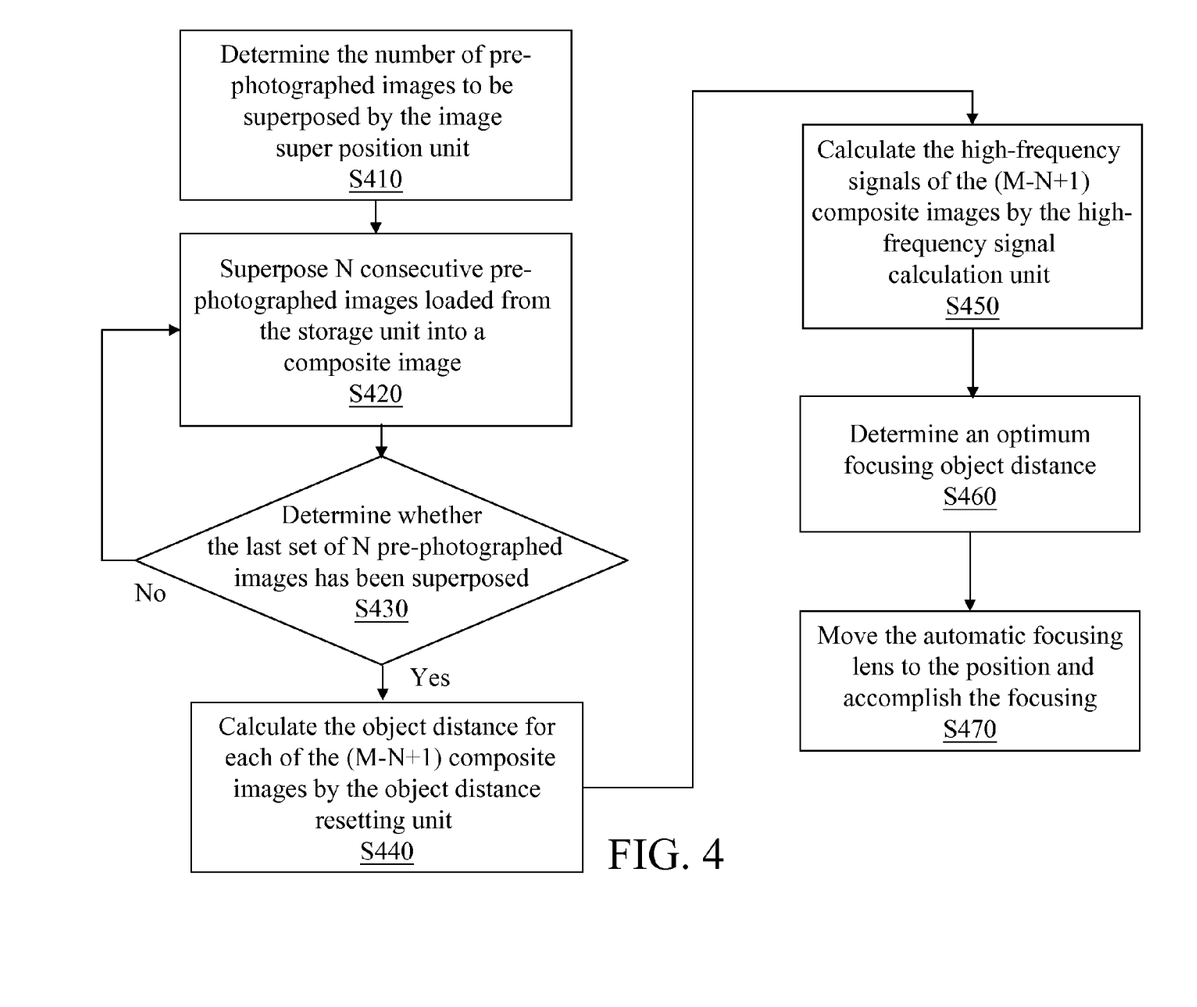
FIG. 4 is a schematic view of an automatic focusing flow in a high-noise environment according to a preferred embodiment of the present invention.

Referring to FIG. 4 together, a preferred embodiment of an automatic focusing flow in a high-noise environment according to the present invention is shown.

In Step S410, the number of pre-photographed images to be superposed is determined by the image superposition unit 372.

In Step S420, N consecutive pre-photographed images loaded from the storage unit 360 are superposed to create a new composite image and write the new composite image into the storage unit 360.

In Step S430, it is determined whether the last set of N pre-photographed images has been superposed, and if not, step S240 is repeated until all the N consecutive pre-photographed images have been superposed.

In Step S440, the object distance for each of the (M−N+1) composite images is calculated by the object distance resetting unit 373.

In Step S450, the high-frequency signals of the (M−N+1) composite images are calculated by the high-frequency signal calculation unit 374.

In Step S460, based on the relation between the high-frequency signals and corresponding object distances for the (M−N+1) composite images, a focusing object distance corresponding to the maximum high-frequency signal is determined as an optimum focusing object distance.

In Step S470, the automatic focusing lens 310 is moved to the position, and focusing is thus accomplished.

In the present invention, it is assumed that N (N<M) digital images exist. The number of pre-photographed images to be superposed is determined based on the environmental brightness or the noise level. Besides, the image superposition unit 372 may alternatively superpose only the portion of the pre-photographed images that is within the focusing frame. After composition of all the pre-photographed images, (M−N+1) composite images are created.

Thereafter, the object distance is calculated by the object distance resetting unit 373 for each of the (M−N+1) composite images by calculating a median point based on the object distances of the superposed pre-graphed images and redefining the median point as the object distance for the corresponding composite image. In the present invention, instead of calculating the high-frequency signal for the whole digital image, the high-frequency signal may alternatively be calculated for only a partial region of the image. For example, a focusing frame may be arranged in the digital image and calculation of high-frequency signal is performed on the focusing frame.

Figure 5:
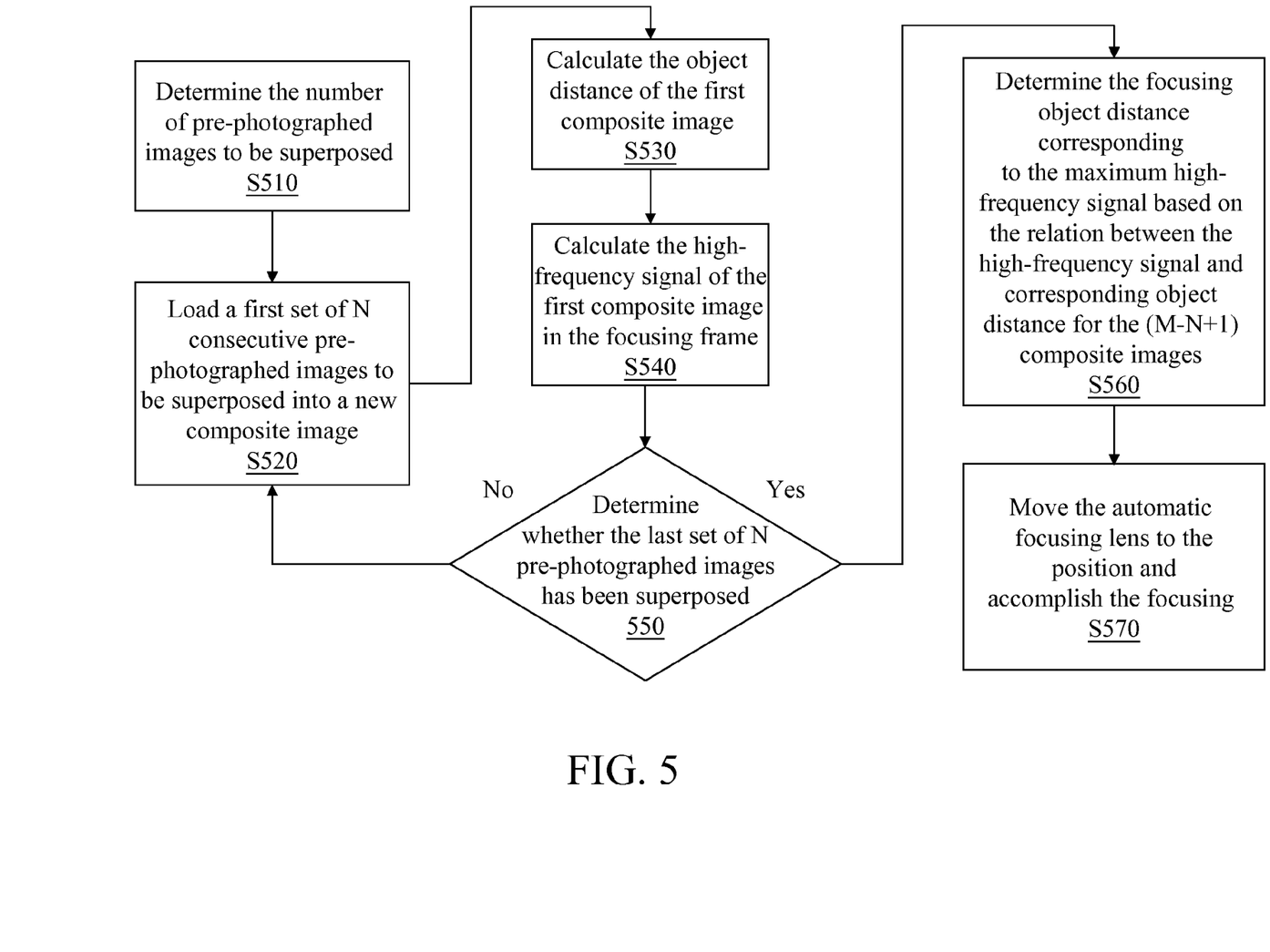
FIG. 5 is a schematic view of an automatic focusing flow in a high-noise environment according to another preferred embodiment of the present invention.

FIG. 5 shows another embodiment of an automatic focusing flow in a high-noise environment according to the present invention.

In Step S510, the number of pre-photographed images to be superposed is determined.

In Step S520, a first set of N consecutive pre-photographed images are loaded from the storage unit 360 to be superposed into a new composite image.

In Step S530, the object distance resetting unit 373 is operated to calculate the object distance of the first composite image $P_1'$ by calculating a median point based on the object distances of the superposed pre-graphed images and redefining the median point as the object distance for the corresponding composite image.

In Step S540, the high-frequency signal of the first composite image $P_1'$ in the focusing frame is calculated.

In Step S550, it is determined whether the last set of N pre-photographed images has been superposed. If not, Steps S520 to S540 are repeated until all the N consecutive pre-photographed images have been superposed and (M−N+1) high-frequency signals and corresponding object distances are generated.

In Step S560, based on the relation between the high-frequency signals and corresponding object distances for the (M−N+1) composite images, the focusing object distance corresponding to the maximum high-frequency signal is determined.

In Step S570, the automatic focusing lens 310 is moved to the position, and focusing is thus accomplished.

In this implementation aspect, it is assumed that N (N<M) digital images exist. The number of the pre-photographed images to be superposed is determined based on the environmental brightness or the noise level.

In Step S520, the image superposition unit 372 may alternatively superpose only the portions of the pre-photographed images in the focusing frame.

What is claimed is:

1. An automatic focusing method in a high-noise environment, applicable for determining a focusing object distance between a digital image device and at least one object to be photographed, comprising:
   taking pre-photographed images at different object distances;
   loading the pre-photographed images;
   superposing the pre-photographed images respectively to generate a plurality of composite images;
   calculating an object distance corresponding to the plurality of composite images;
   calculating a high-frequency signal of at least part of pixels in the plurality of composite images; and
   determining the focusing object distance for the object to be photographed with the high-frequency signal and the corresponding object distance of the plurality of composite images as reference data.

2. The automatic focusing method in a high-noise environment according to claim 1, wherein the high-frequency signal is calculated by a high-pass filter, a band-pass filter, Fourier transformation, discrete cosine transformation, or discrete wavelet transformation.

3. The automatic focusing method in a high-noise environment according to claim 1, wherein before the step of determining the focusing object distance for the object, the automatic focusing method further comprises:
   determining whether every pre-photographed image has been superposed.

4. The automatic focusing method in a high-noise environment according to claim 3, wherein after every pre-photographed image has been superposed, performing the step of calculating the object distance corresponding to the plurality of composite images.

5. A digital imaging device with automatic focusing in a high-noise environment, applicable for determining a focusing object distance for at least one object to be photographed, comprising:
   a storage unit, for storing a plurality of pre-photographed images captured at different object distances;
   a microprocessor, electrically connected to the storage unit, for loading the pre-photographed images;
   an image superposition unit, arranged in the microprocessor, for superposing the pre-photographed images to generate a plurality of composite images under control of the microprocessor;
   an object distance resetting unit, arranged in the microprocessor, for calculating an object distance corresponding to each of the composite images and deriving corresponding object distances of the same number as that of the composite images under control of the microprocessor; and
   a high-frequency signal calculation unit, arranged in the microprocessor, for calculating the high-frequency signal of at least part of pixels in each of the composite images and deriving the high-frequency signals of the same number as that of the composite images under control of the microprocessor;

wherein the microprocessor determines the focusing object distance for the object to be photographed by using the high-frequency signals and the corresponding object distances.

6. The digital imaging device with automatic focusing in a high-noise environment according to claim 5, further comprising an automatic focusing lens and an automatic focusing lens timing control circuit, wherein the automatic focusing lens timing control circuit is electrically connected to the automatic focusing lens and the microprocessor, and the automatic focusing lens timing control circuit receives at least one control instruction from the microprocessor, thereby driving the automatic focusing lens.

7. The digital imaging device with automatic focusing in a high-noise environment according to claim 5, further comprising a photo-sensing element and a photo-sensing element timing control circuit, wherein the photo-sensing element timing control circuit is electrically connected to the photo-sensing element and the microprocessor, and the microprocessor controls the photo-sensing element timing control circuit to generate at least one control signal for driving the photo-sensing element, thereby enabling the photo-sensing element to generate at least one analog signal.

8. The digital imaging device with automatic focusing in a high-noise environment according to claim 7, further comprising an analog-digital conversion circuit electrically connected to the photo-sensing element, the photo-sensing element timing control circuit, and the storage unit, wherein the analog-digital conversion circuit converts the analog signal from the photo-sensing element into a digital signal and stores the digital signal into the storage unit under control of the photo-sensing element timing control circuit and the microprocessor.

9. The digital imaging device with automatic focusing in a high-noise environment according to claim 7, further comprising an automatic exposure parameter determination and control unit arranged in the microprocessor, for determining at least one of an exposure time, an aperture size, and an ISO value used in photographing the object to be photographed based on the environment in which the digital imaging device is photographing.

10. The digital imaging device with automatic focusing in a high-noise environment according to claim 7, wherein the high-frequency signal calculation unit is a high-pass filter, a band-pass filter, a Fourier transformation unit, a discrete cosine transformation unit, or a discrete wavelet transformation unit.

11. The digital imaging device with automatic focusing in a high-noise environment according to claim 5, wherein after every pre-photographed image has been superposed, the object distance resetting unit calculates the object distance corresponding to the composite image.

* * * * *